July 4, 1950 H. P. MILLEVILLE 2,513,813
PROCESS FOR RECOVERING VOLATILE FLAVORS
Filed March 19, 1949
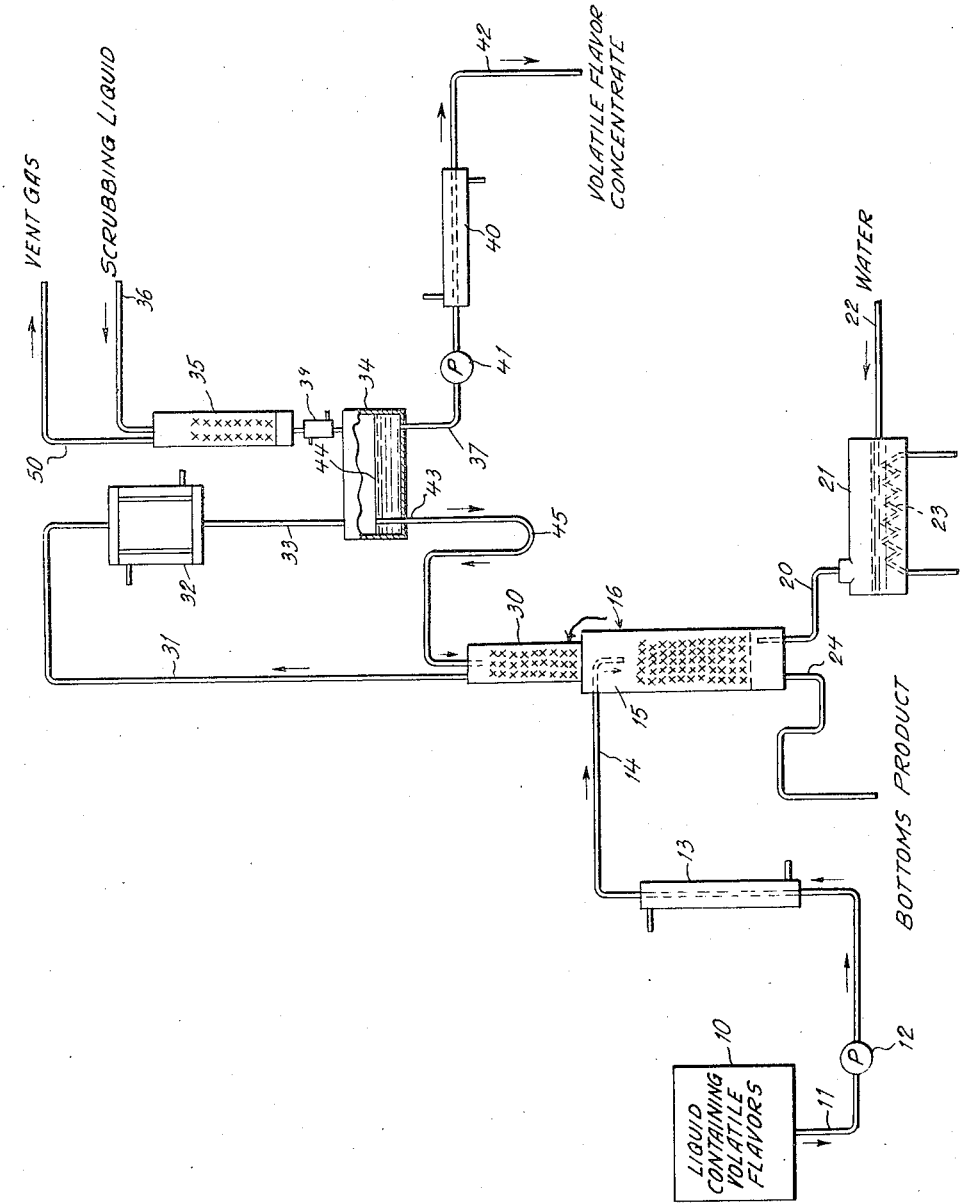
INVENTOR.
HOWARD P. MILLEVILLE
BY John P. Chandler
his ATTORNEY Patented July 4, 1950

2,513,813

UNITED STATES PATENT OFFICE 2,513,813

PROCESS FOR RECOVERING VOLATILE FLAVORS

Howard P. Milleville, Chicago, Ill., assignor of fifty per cent to Donald K. Tressler, Westport, Conn.

Application March 19, 1949, Serial No. 82,396

6 Claims. (Cl. 99—205)

This invention relates to an improved method of recovering volatile flavors from liquids or liquid vapors and relates more particularly to a novel method of obtaining concentrated essences or volatile concentrates from fruits, tea, coffee and plant products generally.

The present invention relates to certain specific improvements in the processes described in my Patent No. 2,457,315 for recovering volatile flavors from fruit juices. Examples I and II of this patent describe their application to recovering volatile apple concentrate (apple essence) from apple juice. The operating conditions described are based on actual pilot-plant experiments. On the pilot-plant scale the vent gas rate varied somewhat but averaged 0.13 cubic feet per hour or 2.6 cubic feet per 1,000 gallons of juice. In subsequent commercial practice I discovered that the vent gas from commercially prepared apple juice ran as high as 26 cubic feet per 1,000 gallons of juice or ten times that previously experienced. Differences in the juices processed account for these differences in the vent-gas rates: cold, fancy-grade juice was processed in the pilot-plant runs; ordinary vinegar stock juice was processed in the commercial runs. Incipient fermentation in the commercially prepared juice resulted in the formation of carbon dioxide, which was held in solution, and which became vent gas in the processing for volatile flavor concentrate. Despite the rather poor taste of this commercially prepared juice it had a fresh apple juice fragrance, and when processed without too much delay by the methods disclosed herein, yielded a volatile concentrate superior in many respects to that prepared from fancy grade juice.

As a result of the foregoing it was found impossible to prepare volatile apple concentrate without a considerable loss of volatile flavors in the vent gas unless the fold or concentration was reduced considerably. The principal object of the present invention is to provide improved means for reducing this loss without reducing the fold of the volatile concentrate.

It has been discovered that if a small quantity of pure water or other solvents free from volatile flavors instead of the condensed volatile flavor concentrate is used in the scrubbing liquid, a very considerable loss of the volatile essence is avoided. Further loss in the case of easily oxidizable material is avoided by carrying out the process under conditions which minimize the amount of oxygen present as hereinafter disclosed.

The process discovered has been found so efficient as to enable the preparation of extremely high folds of volatile concentrates, that is, up to 1000-fold and more.

It has also been determined that when some fruits, other than apple juice, such as strawberry juice were processed under atmospheric pressure in the equipment described in Examples I and II of my previous patent, the yield of volatile fruit concentrate was relatively low and in addition a cooked flavor was imparted to the juice during processing. Although as is disclosed in my previous patent it is possible to avoid cooked flavor by operating under vacuum, such operation is relatively complicated and requires special apparatus and controls. Another object of the present invention is to greatly simplify the method of removing volatile flavors from liquids as well as to make the removal process much more efficient.

The concentrated essence so recovered may be used in any desired fashion quite apart from the fruits being processed or they may be returned to the ultimate food products, such as a jam or a preserve, from which they were originally derived to make a much richer product.

Similarly, in the case of processing tea and coffee for obtaining a concentrated product, the non-volatile constituents can be separately concentrated while the volatile flavors are removed and recovered in concentrated form, after which the two concentrates may be joined to produce a full-flavor tea or coffee extract.

The process of the present invention is useful in the processing of maple sap, vegetables, herbs and other products having volatile components which are invariably lost in any process of preparation which uses heat.

The drawing illustrates schematically the apparatus which may be used in carrying out the process of the present invention. The liquid containing the volatile flavors passes from supply chamber 10 through a conduit 11 and pump 12, through a pre-heater 13 and through delivery conduit 14 into the stripping section 15 of a fractionating column 16.

The temperature to which the liquid is heated in the pre-heater may vary depending upon the product being treated, but in general this temperature should be below the boiling point and, in some instances, the pre-heating may be omitted and the juice run into the stripping section without pre-heating. The advantage of pre-heating, however, is that there is less dilution due to condensation in the fractionating column as a result of contacting the steam with the cold liquid.

As the liquid passes down the stripping section, it is met by an ascending stream of steam which is supplied to the lower end of the stripping section through conduit 20 which is connected with heat exchanger 21. Water, preferably deaerated water, is supplied to the exchanger through feed pipe 22 and heat is furnished from any suitable source such as element 23. Any conventional steam generator may be used as the source of steam.

In this fashion, the volatile flavors and the volatile non-condensible gases in the liquid are removed and the liquid which is stripped of its volatile flavor passes out through a conduit 24 at the lower end of the stripping section. A liquid seal must be maintained at the bottom of the column to prevent the escape of vapors. It is preferred to maintain the liquid level in line 24 by any known manner and thus obtain a minimum quantity of liquid holdup at the bottom of the column.

The steam, the non-condensible gases, and the volatile flavors are then carried upwardly from the stripping section 15 to the rectifying section 30 of the column where they meet a descending stream of concentrated volatile flavors which is the reflux and which results in the rectification or concentration of the volatile flavors in the ascending vapors.

The vapors now concentrated with the volatile flavors pass upwardly through conduit 31 into a condenser 32. From the condenser a mixture of condensed and non-condensed gases pass through conduit 33 to a chamber 34 where the condensate is separated from the non-condensed gases.

In some operations, as for example, where the amount of non-condensible vent gas is excessive, or the process is conducted under vacuum, it may be desirable to provide a condensate cooler (not shown) placed between condenser 32 and chamber 34 or a cooler 39 placed between chamber 34 and vent gas scrubber 35. The non-condensed gases are vented from the system by passage through a scrubbing tower 35 where the volatile flavors not previously condensed are absorbed by a liquid which enters the tower through line 36. The concentrated volatile flavor product is withdrawn from the chamber 34 through conduit 37 at a rate which is dependent upon the strength or concentration desired and is cooled by passing through cooler 40. A pump 41 assures continuous flow of the solution from chamber 34. After leaving the cooler 40 the concentrate passes through delivery pipe 42 to a suitable collection receptacle (not shown). A conduit 43 extends to a predetermined height above the lower wall of chamber 34 as shown at 44. Conduit 43 has a U shaped section 45 for the purpose of maintaining a liquid seal and terminates at the upper end of the rectifying section of the column. Condensate and scrub liquid not withdrawn as product are automatically returned to the column as they overflow the liquid level 44.

The scrubbing tower 35 may be filled with glass wool, Berl saddles, or other suitable packing, down which the scrubbing liquid passes in small quantities while absorbing a major portion of the non-condensible gases. In practice it has been found that the scrubber collects substantially all of the volatile aromatics and the non-condensible, non-aromatic gases pass upwardly through conduit 50 and are normally not collected since they are a waste product.

The liquid used as the absorbing medium for the volatile flavors in the scrubbing tower 35 is ordinarily water. It is also possible to use other liquids which are immiscible with water. In this latter case either the water phase or the non-water phase in chamber 34 can be returned to the fractionating column as reflux depending on which phase is desired as product.

In cases wherein condensates or vapors are processed for volatile flavor concentrates in the fractional distillation system, it has been found convenient to use for scrubbing liquid a portion of the bottoms product from line 24 after it has been cooled. In such cases the liquid discharged from the scrubbing tower can be collected separately and instead of being mixed with the condensate in chamber 34 it can be returned to the fractionating column. This arrangement is a useful one in any case where a sterile scrubbing liquid is not readily available and it is desired to keep the volatile flavors sterile.

It will be seen from the foregoing that once the system is in operation and deaerated makeup water is fed into the system (pipe 22) the stripping section of the fractionating column will be filled with steam and that oxygen will be present in only the proportion it was present in the feed. This is a very important feature of the present invention since it completely eliminates the possibility of oxidizing any otherwise readily oxidizable flavors.

In the first four examples given below, the volatile flavor in the produce is concentrated a hundred times more than that in the feed. (Note that in Example 1, the volatile flavors in the feed may already be concentrated two or more times with respect to the concentration existing in fruit from which the preserve is being made, so that the concentration of the volatile flavors in the product is 200 or more times with respect to that in the fruit.) In Example 5, the volatile flavors in the product are concentrated 500 times more than in the feed. In Example 6 a 200-fold product is prepared, then absorbed by anhydrous dextrose to form a 20-fold solid product.

*Example 1.—Processing condensate obtained from manufacture of preserves*

Operations are conducted at atmospheric pressure. The condensate is fed to the top of the stripping section of the fractionating column at the rate of 100 gallons per hour. It is pre-heated to 200° F. Steam is generated either in a reboiler of the column or in a separate boiler at the rate of 20 gallons per hour. The stripping section of the fractionating column is 10 inches in diameter and is packed with ½-inch Berl saddles for a depth of 8 feet. The rectifying section is 6 inches in diameter packed with ½-inch Berl saddles to a depth of 6 feet. The bottoms product is discarded from the system without cooling. The condenser is so designed and operated that the temperature of the condensate is approximately 120° F. Water is used as vent-gas scrubbing liquid. It is run into the vent-gas scrub tower at the rate of 2 gallons per hour at a temperature of 70° F. The scrub tower is 2 inches in diameter and 3 feet long packed with ¼-inch Berl saddles. Volatile flavor product is withdrawn at the rate of 1 gallon per hour after cooling to 70° F.

*Example 2.—Processing tea extract*

Operations same as above with following modifications: (1) stripping section is packed with 1-inch Berl saddles, (2) stripping section diameter is 9 inches and packed depth is 12 feet, and (3) bottoms product is flashed into a vacuum pan where it is cooled to the operating temperature of the vacuum pan.

*Example 3.—Processing strawberry juice*

Operations same as in Example 2.

*Example 4.—Processing strawberry juice*

Operations same as in Example 3 but bottoms product is cooled by passage through a water-cooled tube.

*Example 5.—Processing strawberry juice*

Operations same as in Example 4 with the following exceptions: (a) a liquid non-miscible with water, such as an edible organic solvent, is used as the vent-gas scrubbing liquid, (b) the vent-gas scrub tower is packed with glass wool to a height of 9 feet, (c) the solvent is added to the tower at the rate of ⅕ gallon per hour and sinks to the bottom of the condensate and vent-gas separating chamber under the condenser, (d) the solvent is withdrawn from the separating chamber as product at the rate at which it accumulates in the chamber or approximately ⅕ gallon per hour, all of the aqueous condensate being returned to the fractionating column as reflux through an overflow device.

*Example 6.—Processing coffee extract*

Operations same as in Example 4 with the exception that the volatile flavor product is withdrawn at the rate of ½ gallon per hour to prepare a 200-fold volatile coffee concentrate. This volatile concentrate can then be taken up in anhydrous dextrose in the ratio of 1 to 10 by weight. When this dry flavor (a 20-fold volatile flavor concentrate) is added to powdered soluble coffee, the resulting beverage tastes much more like freshly-brewed coffee than that made from the soluble powdered coffee alone.

It will be apparent that many changes and modifications may be made in the foregoing process without departing from the spirit of the invention as defined by the appended claims.

What I claim is:

1. The process of obtaining a concentrated solution of volatile components from solutions containing such volatiles which consists in passing the solution into the stripping section of a fractionating column while causing a stream of steam to ascend from the lower end of the column to strip the volatiles from the solution, withdrawing the vaporized product from the upper end of the rectifying section of the column and condensing such vapors, passing the non-condensible gases into a scrubbing tower, contacting such gases by a stream of water to absorb the volatile components from the gases, returning such volatile components to the system, and recirculating the condensed vapors through the rectifying section until a desired concentration has been reached.

2. A continuous process for obtaining a concentrated solution of volatile flavors from solutions containing such volatiles which consists in preparing a solution containing the product, preheating the solution, passing the pre-heated solution into the upper end of the stripping section of a fractionating column while causing a stream of steam to ascend from the lower end of the column to strip the volatile flavors from the solution, withdrawing the vaporized product from the upper end of the rectifying section of the column and condensing such vapors, passing the non-condensible gases into a scrubbing tower, contacting such gases by a fine stream of water to absorb the volatile components from the gases, returning such volatile components to the system, recirculating the condensed vapors through the rectifying section until a desired concentration has been reached and then withdrawing a portion of the liquid from the system while continuing to recirculate the remainder of the liquid.

3. The process of obtaining a concentrated solution of volatile components from solutions containing such volatiles which comprises passing the solution into the stripping section of a fractionating column while causing a stream of steam to ascend from the lower end of the column to strip the volatiles from the solution, withdrawing the vaporized product containing easily condensible vapor and non-condensible gases from the upper end of the rectifying section of the column and condensing such vapors, passing the condensed vapors and non-condensible gases into a receptacle, passing the non-condensible gases from the receptacle into a scrubbing tower, contacting such gases by a stream of water which absorbs the volatile components from the gases, passing the water containing such volatile components to the system, recirculating the condensed vapors through the rectifying section until a desired concentration has been reached and then withdrawing a portion of the concentrate from the system.

4. The process of obtaining a concentrated solution of volatile components from solutions containing such volatiles which comprises passing the solution into the stripping section of a fractionating column while causing a stream of steam to ascend from the lower end of the column to strip the volatiles from the solution, withdrawing the vaporized product from the upper end of the rectifying section of the column and condensing such vapors, passing the condensed vapors into a receptacle while allowing the non-condensible gases to pass from the receptacle into a scrubbing tower where such gases are contacted by an edible organic solvent which absorbs the volatile components from the gases and returns the same to the receptacle, recirculating the condensed vapors through the rectifying section until a desired concentration has been reached and withdrawing from the receptacle the solvent containing the volatile components as product.

5. The process of obtaining a concentrated solution of volatile components from solutions containing such volatiles, which consists in passing the solution into the stripping section of a fractionating column while causing a stream of steam to ascend from the lower end of the column to strip the volatiles from the solution, withdrawing the bottoms product from the lower end of such stripping section, withdrawing the vaporized product which contains easily condensible vapors and non-condensible gases from the upper end of the rectifying section of the column and condensing such easily condensible vapors, passing the latter and the non-condensible gases into a closed receptacle, passing the non-condensible gases into a scrubbing tower, contacting such gases in the scrubbing tower by a solvent which is free from the condensed vapors and in which the volatile components are readily soluble, and returning such solvent containing the volatile components to the system, withdrawing a portion of the liquids in the receptacle as end product and returning the balance thereof to the fractionating column.

6. The process of obtaining a concentrated solution of volatile components from solutions containing such volatiles which consists in passing the solution into the stripping section of a fractionating column while causing a stream of steam to ascend from the lower end of the column to strip the volatiles from the solution, withdrawing the bottoms product from the lower end of such stripping section, withdrawing the vaporized product which contains easily condensible vapors and non-condensible gases from the upper end of the rectifying section of the column and condensing such easily condensible vapors, passing the latter and the non-condensible gases into a closed receptacle, passing the non-condensible gases into a scrubbing tower where such gases are contacted by a stream of water which absorbs volatile components from said gases, and returning such water containing the volatile components to the system, withdrawing a portion of the liquids in the receptacle as end product and returning the balance thereof to the fractionating column.

HOWARD P. MILLEVILLE.

REFERENCES CITED

The following references are of record in the file of this patent:

UNITED STATES PATENTS

| Number | Name | Date |
|---|---|---|
| 2,457,315 | Milleville | Dec. 28, 1948 |